(12) United States Patent
Duffie et al.

(10) Patent No.: US 7,480,602 B2
(45) Date of Patent: Jan. 20, 2009

(54) SYSTEM VERIFICATION TEST USING A BEHAVIOR MODEL

(75) Inventors: Paul Kingston Duffie, Palo Alto, CA (US); Patrick Hornberger, Mountain View, CA (US); Carl Hubbard, Los Altos, CA (US); Satomi Okazaki, Palo Alto, CA (US); Pawan Singh, Sunnyvale, CA (US)

(73) Assignee: The Fanfare Group, Inc., Mountain View, CA (US)

( * ) Notice: Subject to any disclaimer, the term of this patent is extended or adjusted under 35 U.S.C. 154(b) by 665 days.

(21) Appl. No.: 11/040,348

(22) Filed: Jan. 20, 2005

(65) Prior Publication Data

US 2006/0161508 A1 Jul. 20, 2006

(51) Int. Cl.
*G06F 17/50* (2006.01)

(52) U.S. Cl. .............................. 703/13; 703/15; 703/22; 714/38; 714/31; 714/724

(58) Field of Classification Search ...................... 703/2, 703/20–22, 13, 15; 716/1, 4, 5; 710/1, 317; 714/38, 31, 724; 702/66; 726/9; 712/1
See application file for complete search history.

(56) References Cited

U.S. PATENT DOCUMENTS

| 5,920,490 | A | 7/1999 | Peters |
|---|---|---|---|
| 6,131,078 | A | 10/2000 | Plaisted |
| 6,154,801 | A | 11/2000 | Lowe et al. |
| 6,182,258 | B1 | 1/2001 | Hollander |
| 6,195,616 | B1 | 2/2001 | Reed et al. |
| 6,347,388 | B1 | 2/2002 | Hollander |
| 6,397,245 | B1 | 5/2002 | Johnson et al. |
| 6,530,054 | B2 | 3/2003 | Hollander |
| 6,539,522 | B1 | 3/2003 | Devins et al. |
| 6,587,813 | B1 | 7/2003 | Whitt et al. |
| 6,633,832 | B1 | 10/2003 | Browen |
| 6,684,169 | B2 * | 1/2004 | Masella et al. ................ 702/66 |
| 6,708,143 | B1 | 3/2004 | Kurshan |
| 6,754,763 | B2 * | 6/2004 | Lin ............................ 710/317 |
| 6,804,634 | B1 | 10/2004 | Holzmann et al. |

(Continued)

OTHER PUBLICATIONS

Fallah, F. et al., "Functional Vector Generation for Sequential HDL Models Under an Observability-Based Code Coverage Metric," IEEE Transactions on Very Large Scale Integration (VLSI) Systems, Dec. 2002, vol. 10, No. 6, pp. 919-923.

(Continued)

*Primary Examiner*—Kandasamy Thangavelu
(74) *Attorney, Agent, or Firm*—Fenwick & West LLP

(57) ABSTRACT

The present invention provides a system verification system that automatically generates a behavior model modeling the system under test in terms of actions of a test case and a range of expected reactions corresponding to those actions. In this regard, the system verification system obtains a set of actions and individual reactions corresponding to the actions from a plurality of runs of a test case for the system under test, and automatically generates the behavior model representing the system under test in terms of the set of actions and a range of expected reactions each range corresponding one of the actions. The range of expected reactions generalizes and includes all or most of the individual reactions corresponding to said one of the actions.

24 Claims, 13 Drawing Sheets

U.S. PATENT DOCUMENTS

| | | | |
|---|---|---|---|
| 2002/0100022 A1 | 7/2002 | Holzmann | |
| 2003/0208351 A1* | 11/2003 | Hartman et al. | 703/22 |
| 2004/0078178 A1* | 4/2004 | Blasi et al. | 703/15 |
| 2004/0205406 A1* | 10/2004 | Kaliappan et al. | 714/31 |
| 2005/0262399 A1* | 11/2005 | Brown et al. | 714/38 |
| 2006/0020860 A1* | 1/2006 | Tardif et al. | 714/724 |
| 2006/0075305 A1* | 4/2006 | Robinson et al. | 714/38 |
| 2006/0112257 A1* | 5/2006 | Undy et al. | 712/1 |
| 2006/0130131 A1* | 6/2006 | Pai et al. | 726/9 |

OTHER PUBLICATIONS

Lajolo, M. et al., "Behavioral-Level Test Vector Generation for System-On-Chip Designs," Proceedings of IEEE International High-Level Design Validation and Test Workshop, Nov. 2000, pp. 21-26.

PCT International Search Report and Written Opinion, PCT/US06/01127, Sep. 12, 2006, 12 pages.

Radecka, K. et al., "Design Verification by Test Vectors and Arithmetic Transform Universal Test Set," IEEE Transactions on Computers, May 2004, vol. 53, No. 5, pp. 628-640.

Schneider, A. et al., "Internet-Based Collaborative Test Generation with Moscito," Proceedings of the 2002 Design, Automation and Test in Europe Conference and Exhibition, Mar. 2002, 9 pages.

Soboleski, A., "Using High Level Design Models for Generation of Test Vectors," Proceedings of the 5th Annual IEEE International ASIC Conference and Exhibit, Sep. 1992, pp. 345-348.

Hirschberg, Daniel S., "Algorithms for the Longest Common Subsequence Problem," Oct. 1977, Journal of the Association for Computing Machinery, vol. 24, No. 4, pp. 664-675.

* cited by examiner

Captured Behavior

Name /Test Cases/Cisco Emulator/IP demo/Captures/20041112.1/IP demo.bm?Rev=0
Description

Configuration

Testbed    /Testbeds/Cisco Emulator Port 16200.tb?Rev=2  ⌒ 708

Actual Timing

Start      11/12/2004 10:31:40 AM

Duration   00:01:18.1250000

702 Annotated Steps login

| | | | | | |
|---|---|---|---|---|---|
| 00:05.062 | C1.1 | CLI | S1 | Open | Tester:1211 > Emulator:16200 |
| 00:29.550 | C1.2 | CLI | S1 | Command | root |
| 00:30.976 | C1.3 | CLI | S1 | Command | fanfare |

704 view software version

706

| 01:03.888 | C1.4 | CLI | S1 | Command | show version |
|---|---|---|---|---|---| exit

| 01:13.010 | C1.5 | CLI | S1 | Command | exit |
|---|---|---|---|---|---|
| 01:13.033 | C1.6 | CLI | S1 | Close | Close Session: S1 |

Keywords none

Comments and Attachments none

Change History

Created    11/12/2004 10:32:58 AM
Created by  fanfare\chubbard

FIG. 7A

Behavior Primitive C1.4: CLI S1 Command

Timing 712
Actual
Start delay   n/a
Response      0.199 —— 714

Action
> show version

Reaction 710
> Cisco IOS Software, 3600 Software (C3660-I-M), Version 12.3
> TAC Support: http://www.cisco.com/tac
> Copyright (c) 1986-2004 by Cisco Systems, Inc.
> Compiled Thu 18-Sep-03 15:37 by ccai
>
> ROM: System Bootstrap, Version 12.0(6r)T, RELEASE SOFTWARE (fc1)
>
> Router uptime is 0 week, 0 days, 0 hours, 49 minutes
> System returned to ROM by power-on
> System image file is slot0:tftpboot/c3660-i-mz.123-4.T
>
> Cisco 3660 (R527x) processor (revision 1.0) with 57344K/8192K bytes of memory.
> Processor board ID JAB055180FF
> R527x CPU at 225Mhz, Implementation 40, Rev 10.0, 2048KB L2 Cache
>
> 3660: Chassis(Type): ENTERPRISE
> 4:      Ethernet interfaces
> DRAM configuration is 64 bits wide with parity disabled.
> 125K bytes of NVRAM.
> 16384K bytes of processor board System flash (Read/Write)
>
> Flash card inserted. Reading filesystem...done.
> 20480K bytes of processor board PCMCIA Slot0 flash (Read/Write)
>
> Configuration register is 0x2102
> Router>

Patterns   No anomalies

FIG. 7B

Requested Behavior

Name  /Test Cases/Cisco Emulator/IP demo/IP demo.bm?Rev=0
Description

Configuration

Testbed    /Testbeds/Cisco Emulator Port 16200.tb  ⟵ 808

802 Annotated Steps

— login

|            |     |     |    |         |                          |
|------------|-----|-----|----|---------|--------------------------|
| 00:00.023  | C1.1 | CLI | S1 | Open    | Tester:1211 > Emulator:16200 |
| 00:01.658  | C1.2 | CLI | S1 | Command | root                     |
| 00:02.220  | C1.3 | CLI | S1 | Command | fanfare                  |

804
— view software version 806    00:02.579    C1.4    CLI    S1    Command    show version
— exit

| 00:03.199 | C1.5 | CLI | S1 | Command | exit               |
| 00:03.522 | C1.6 | CLI | S1 | Close   | Close Session: S1  |

Keywords none

Comments and Attachments none

Change History

Created      11/12/2004 10:41:30 AM
Created by   fanfare\chubbard

FIG. 8A

Behavior Primitive C1.4: CLI S1 Command

Expected

Timing
812
Start delay 0.359
Response 1.438 — 814

Action
show version

Reaction
810

Cisco IOS Software, 3600 Software (C3660-I-M), Version 12.3
TAC Support: http://www.cisco.com/tac
Copyright (c) 1986-2004 by Cisco Systems, Inc.
Compiled Thu 18-Sep-03 15:37 by ccai ROM: System Bootstrap, Version 12.0(6r)T, RELEASE SOFTWARE (fc1)

Router uptime is {T1} — 816
System returned to ROM by power-on
System image file is slot0:tftpboot/c3660-i-mz.123-4.T Cisco 3660 (R527x) processor (revision 1.0) with 57344K/8192K bytes of memory.
Processor board ID JAB055180FF
R527x CPU at 225Mhz, Implementation 40, Rev 10.0, 2048KB L2 Cache 3660: Chassis(Type): ENTERPRISE
4:      Ethernet interfaces
DRAM configuration is 64 bits wide with parity disabled.
125K bytes of NVRAM.
16384K bytes of processor board System flash (Read/Write)

Flash card inserted. Reading filesystem...done.
20480K bytes of processor board PCMCIA Slot0 flash (Read/Write)

Configuration register is 0x2102
Router>

Patterns
{T1}  Numeric (or translatable to numeric) — 818
\* TimeCounter: Minutes

FIG. 8B

Executed Behavior

Name    /Test Cases/Cisco Emulator/IP demo/Executions/20041112/IP demo.1.bm?Rev=0
Description

Configuration

Testbed    /Testbeds/Cisco Emulator Port 16200.tb?Rev=2 — 908

Actual Timing — 910

Start    11/12/2004 10:55:41 AM

Duration  00:00:03.7660000

Annotated Steps   902 login

| | | | | | | |
|---|---|---|---|---|---|---|
| 00:00.023 | 00:00.023 | C1.1 | CLI | S1 | Open | Tester:1242 > Emulator:16200 |
| 00:01.658 | 00:01.663 | C1.2 | CLI | S1 | Command | root |
| 00:02.220 | 00:02.226 | C1.3 | CLI | S1 | Command | fanfare |

904 — view software version

906

| | | | | | | |
|---|---|---|---|---|---|---|
| 00:02.579 | 00:02.585 | C1.4 | CLI | S1 | Command | show version | exit

| | | | | | | |
|---|---|---|---|---|---|---|
| 00:03.199 | 00:03.194 | C1.5 | CLI | S1 | Command | exit |
| 00:03.522 | 00:03.523 | C1.6 | CLI | S1 | Close | Close Session: S1 |

Keywords none

Comments and Attachments none

Change History

Created    11/12/2004 10:55:45 AM
Created by  fanfare\chubbard

FIG. 9A

Behavior Primitive C1.4: CLI S1 Command

Expected

Timing  Start delay  0.359
        Response     1.438 — 814

Actual

Start delay  n/a
Response     0.156 — 916  — 904

| Action | show version — 804 | show version — 914 |
|---|---|---|
| Reaction | Cisco IOS Software, 3600 Software (C3660-I-M), Version 12.3<br>TAC Support: http://www.cisco.com/tac<br>Copyright (c) 1986-2004 by Cisco Systems, Inc.<br>Compiled Thu 18-Sep-03 15:37 by ccai<br><br>ROM: System Bootstrap, Version 12.0(6r)T, RELEASE SOFTWARE (fc1)<br><br>Router uptime is {T1}<br>System returned to ROM by power-on<br>System image file is slot0:tftpboot/c3660-i-mz.123-4.T<br><br>Cisco 3660 (R527x) processor (revision 1.0) with 57344K/8192K bytes of memory.<br>Processor board ID JAB055180FF<br>R527x CPU at 225Mhz, Implementation 40, Rev 10.0, 2048KB L2 Cache<br><br>3660: Chassis(Type): ENTERPRISE<br>4: Ethernet interfaces<br>DRAM configuration is 64 bits wide with parity disabled.<br>125K bytes of NVRAM.<br>16384K bytes of processor board System flash (Read/Write)<br><br>Flash card inserted. Reading filesystem...done.<br>20480K bytes of processor board PCMCIA Slot0 flash (Read/Write)<br><br>Configuration register is 0x2102<br>Router> | CISCO IOS SOFTWARE, 3600 SOFTWARE (C3660-I-M), VERSION 12.3<br>TAC Support: http://www.cisco.com/tac<br>Copyright (c) 1986-2004 by Cisco Systems, Inc.<br>Compiled Thu 18-Sep-03 15:37 by ccai<br><br>ROM: System Bootstrap, Version 12.0(6r)T, RELEASE SOFTWARE (fc1)<br><br>Router uptime is 0 week, 0 days, 1 hours, 12 minutes<br>System returned to ROM by power-on<br>System image file is slot0:tftpboot/c3660-i-mz.123-4.T<br><br>Cisco 3660 (R527x) processor (revision 1.0) with 57344K/8192K bytes of memory.<br>Processor board ID JAB055180FF<br>R527x CPU at 225Mhz, Implementation 40, Rev 10.0, 2048KB L2 Cache<br><br>3660: Chassis(Type): ENTERPRISE<br>4: Ethernet interfaces<br>DRAM configuration is 64 bits wide with parity disabled.<br>125K bytes of NVRAM.<br>16384K bytes of processor board System flash (Read/Write)<br><br>Flash card inserted. Reading filesystem...done.<br>20480K bytes of processor board PCMCIA Slot0 flash (Read/Write)<br><br>Configuration register is 0x2102<br>Router> |

Patterns

{T2} Word
Value: Cisco

{T3} Word
Value: Software

{T4} Word
Value: Software

{T5} Word
Value: Version

{T1} Numeric (or translatable to numeric)
\* TimeCounter: Minutes

A1 Response anomaly: T2
Expected: Cisco
Received: CISCO

A2 Response anomaly: T3
Expected: Software
Received: SOFTWARE

A3 Response anomaly: T4
Expected: Software
Received: SOFTWARE

A4 Response anomaly: T5
Expected: Version
Received: VERSION

FIG. 9C

SYSTEM VERIFICATION TEST USING A BEHAVIOR MODEL

TECHNICAL FIELD

The present invention relates to system verification test (SVT) and, more specifically, to system verification test using a behavior model representative of the range of expected reactions from the System Under Test (SUT) corresponding to actions to the SUT.

BACKGROUND OF THE INVENTION

Most systems, whether it is a hardware system or a software system, requires quality assurance (QA) and system verification tests (SVT) before it is released for actual use by the public. Conventional methods of SVT include convention manual SVT and conventional automated SVT.

The conventional manual SVT process typically involves the steps of (i) gaining an understanding of the feature to be tested on the SUT, (ii) designing one or more test cases to validate the features, (iii) executing the test case(s) manually, and (iv) analyzing the results of the executed test case(s). Obviously, the goal is to verify that the SUT meets the requirements for how a given feature is intended to operate based on the execution results of the test case(s).

The disadvantage of conventional manual SVT is that it requires regression testing to be done manually, i.e., manually repeating the test cases when the SUT has changed, typically because of a new build, new release, or changes in the SUT's hardware or software. Regression testing using conventional manual SVT is labor-intensive, time-consuming, and error-prone, because there is no automation involved.

Conventional automated SVT replaces the labor involved in repetitive conventional manual SVT with work that is performed automatically by a computer. The conventional automated SVT process typically involves (i) gaining an understanding of the feature to be tested on the SUT, (ii) designing one or more test cases to validate the feature, (iii) executing the test case(s) manually, (iv) analyzing the results of the executed test case, (v) designing a script that can execute the test case(s) automatically, (vi) testing the script to make sure that it produces no false-negatives and no false-positives, (vii) configuring an automation infrastructure so that the script will run at regular intervals automatically, (viii) reviewing the results from automated regression testing and identifying test cases that require review, (ix) analyzing the results from failed scripts, i.e., filing defect reports and annotating them accordingly, and (x) modifying the scripts as necessary when the script has reported a false-negative failure, typically because the SUT's behavior has changed in an acceptable way that was not anticipated by the script.

A script is procedural, i.e., it describes a series of steps to follow, some of which invoke certain actions to be taken on the SUT. Other steps are to check certain reactions from the SUT to the actions. Procedural computer programming languages, such as C, TCL, PERL, etc. are typically used to design the scripts used in conventional automated SVT.

The benefit of conventional automated SVT is that the test case is automatically executed repeatedly and that test cases and failed scripts are further reviewed and modified, if necessary, in steps (viii)-(x) above. However, because the human labor involved in designing a script that can execute a test case, testing the script to make sure that it produces no false-negatives and no false-positives, and modifying the scripts as necessary when the script has reported a false-negative failure are significant, the benefit from test automation comes only after the test case is executed many times. A lot of times, intense human labor is required to design a script for executing a test case.

Therefore, there is a need for an automated SVT process that can eliminate the repetitive, mundane, labor-intensive aspects of designing, testing, and maintaining test automation scripts for executing test cases. There is also a need for an automated SVT process that can eliminate the use of scripts for executing test cases.

SUMMARY OF THE INVENTION

The present invention provides a system verification system that automatically generates a behavior model modeling the system under test in terms of actions of a test case and a range of expected reactions corresponding to each of those actions. In this regard, the system verification system obtains a set of actions and individual reactions corresponding to each of the actions from a plurality of runs of a test case for the system under test, and automatically generates the behavior model representing the system under test in terms of the set of actions and a range of expected reactions each range corresponding to one of the actions. The range of expected reactions generalizes and includes all or most of the individual reactions corresponding to said one of the actions.

In one embodiment, the system verification system obtains the set of actions and individual reactions by capturing primitives including the actions and the individual reactions from packets exchanged between the system verification system and the system under test. In another embodiment, these primitives are provided to the system verification system by a third party.

The system verification system generates the behavior model of the system under test by generating a prototype behavior model for the system under test based upon the actions and individual reactions corresponding to the actions from a single run of the test case, generating an executable behavior model based on the prototype behavior model where the executable behavior model includes the actions in at least a plurality of runs of the test case, executing the executable behavior model on the system under test to obtain the individual reactions corresponding to each of the actions in the plurality of runs of the test case, and generating a generalized behavior model including the actions in the test case and the range of expected reactions, where each of the range of expected reactions generalizes the individual reactions corresponding to said one of the actions from the plurality of runs of the test cases.

The generalized behavior model is generated by generating tokens corresponding to the individual reactions received from the system under test when the executable behavior model is executed, identifying the tokens that match and do not match responsive to said one of the actions, identifying patterns in the tokens that do not match responsive to said one of the actions, and generating the generalized behavior model including invariant portions corresponding to the tokens that match and parameterized portions corresponding to the patterns in the tokens. In one embodiment, the behavior model is described in XML (eXtensible Markup Language).

Once the behavior model of the system under test is created, the system verification system can perform system verification functions by executing the behavior model on the system under test and capturing the resulting individual reactions corresponding to the actions in the executed behavior model. Resulting individual reactions that are not consistent with the range of expected reactions are identified as anomalies in the system under test.

Since the system verification system of the present invention is an automated system that can automatically generate the behavior model based on the actions and corresponding reactions captured from one or more runs of a test case, the labor involved in writing, testing, and maintaining scripts in SVT is eliminated. At the same time, the scriptless automated SVT system of the present invention results in better test coverage and fewer test escapes ("false positives").

BRIEF DESCRIPTION OF THE DRAWINGS

The teachings of the present invention can be readily understood by considering the following detailed description in conjunction with the accompanying drawings. Like reference numerals are used for like elements in the accompanying drawings.

FIGS. 7A and 7B illustrate a sample user interface provided by the SVT system when the primitives are captured in step 204 of FIG. 2, according to one embodiment of the present invention.

FIGS. 8A and 8B illustrate a sample user interface provided by the SVT system when the generalized BM of the SUT is created in step 206 of FIG. 2, according to one embodiment of the present invention.

FIGS. 9A, 9B, and 9C illustrate a sample user interface provided by the SVT system when the BM of the SUT is executed in step 208 of FIG. 2, according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Figure 1:
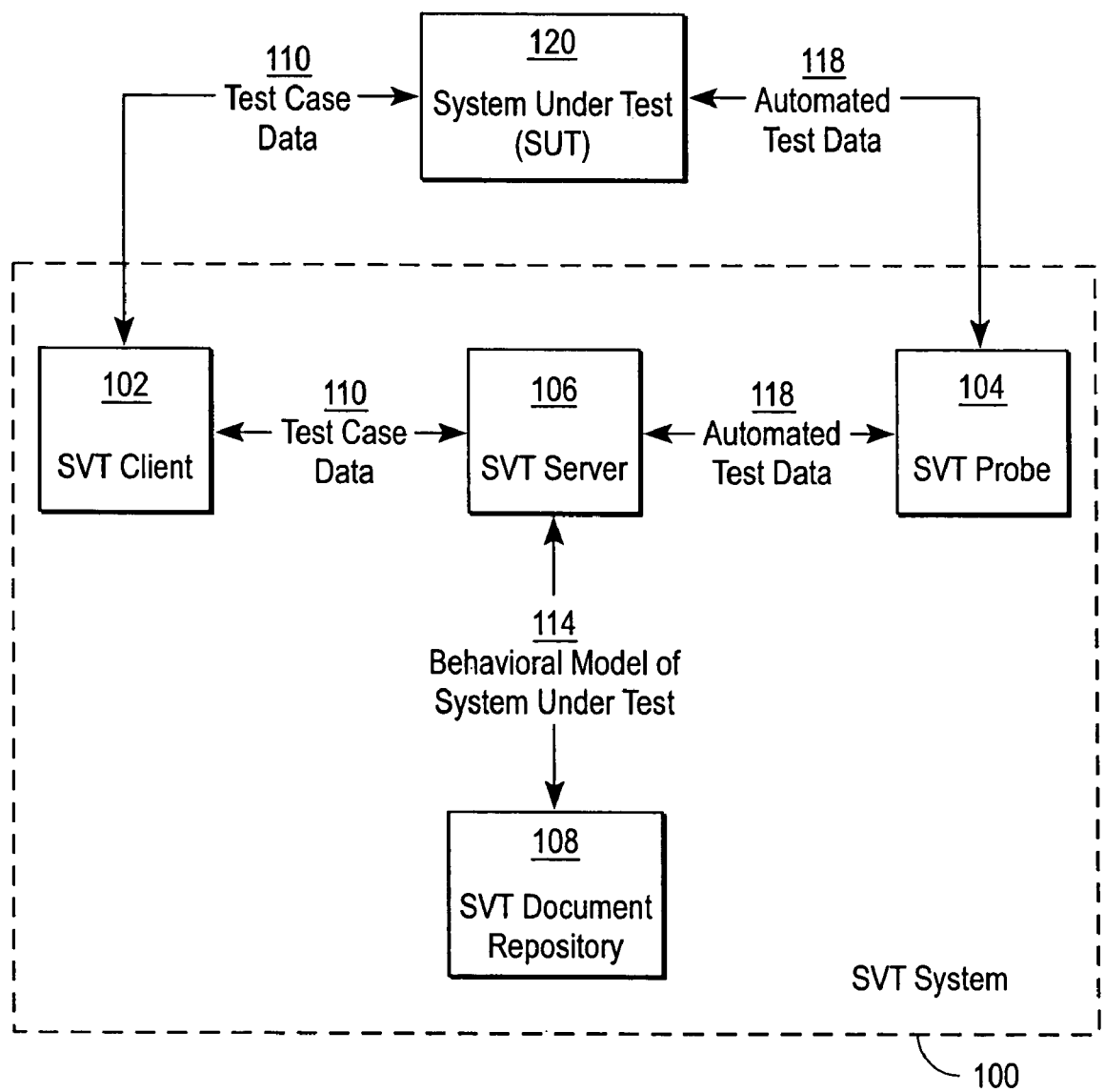
FIG. 1 is a block diagram illustrating the architecture of the System Verification Test (SVT) system, according to one embodiment of the present invention.

FIG. 1 is a block diagram illustrating the architecture of the System Verification Test (SVT) system 100 according to one embodiment of the present invention. The SVT system 100 verifies the functionalities of, and assures the quality of, the System Under Test (SUT) 120 according to the SVT process of the present invention. In one embodiment, the SVT system 100 includes an SVT server 106, an SVT client 102, an SVT probe 104, and an SVT document repository 108. The SVT server 106, SVT client 102, and the SVT probe 104 may be separate computers operating within the SVT system 100, and the SVT document repository 108 may be a database running on a separate database server or can also be part of the SVT server 106 itself. The SUT 120 may be any type of hardware devices, such as a computer, a networking device, a router, etc., or can also be computer software running on a computer.

The SVT client 102 captures data 110 while a test case is performed on the SUT 120. For example, the SVT client 102 may be a personal computer (PC) and the PC's network card can be used to monitor the actual data traffic exchanged between the SVT client 102 and the SUT 120. The SVT client 102 is positioned such that it can capture such test case data 110. In one embodiment, the SVT client 102 processes the captured test case data 110 and provides the captured test data 110 to the SVT server 106. In another embodiment, the SVT client 102 may even generate a behavior model (BM) of the SUT 120 according to the methods of the present invention and provide such BM to the SVT server 106 together with the test case data 110.

The SVT client 102 provides a user interface to review, edit, and take action on documents stored in the SVT document repository 108. These actions are, in some cases, also performed on the SVT client 102 itself. For example, executing a test case, capturing test case data 110, and building a BM, when performed interactively (rather than on a scheduled basis), are performed on the SVT client 102 itself. Note that there may be more than one SVT client 102 corresponding to a plurality of SUTs 120.

The SVT probe 104 is an application that runs on a computer continuously as a service of the SVT system 100. The SVT probe 104 is used to perform automated testing of the SUT 120 according to a schedule determined by the SVT server 106. For example, nightly execution of automated test cases may be performed by the SVT probe 104 on the SUT 120 to obtain automated test data 118 for evaluation of the SUT 120.

The SVT document repository 108 is a database of documents used as a virtual storage device for document used in the SVT system 100. In one embodiment, the documents are organized into a hierarchy of document folders and users of the SVT client 102 can browse through the document repository 108 to find the documents of interest to them. Searching capabilities may also be provided to find certain types of documents that match selected criteria.

The SVT document repository 108 stores many different types of documents, for example, test case(s) for the SVT process, test report(s) generated by the SVT system 100 as a result of the SVT process, a behavior model (BM) 114 modeling the SUT 120 in terms of expected reactions from the SUT 120 corresponding to certain actions to the SUT 120, activity requests, activity reports, and so on. Each document has a specific purpose, contains information that is specific to the type of the document, and has its own specialized editor, viewer, and printer. At the same time, the documents may share certain things in common, such as keywords, comments and attachments added to them, revision tracking information, and so on. The documents in the document repository 108 may be linked to each other. A test report document, for example, may have a link to the test case document that was executed to produce such test report. A test case document may have a set of links identifying the test beds (i.e., source, equipment, and target of the SVT) that are suitable for executing that test case.

The documents in the document repository 108 supports specific tasks. For example, to capture the behavior of the SUT 120 while a test case is executed manually, a "capture" action on the corresponding test case document is invoked. The result of most actions of the documents is an update to the document itself and/or the creation and/or update of other documents.

The SVT server 106 performs centralized processing functions for the SVT process of the present invention. As will be explained in greater detail below, in one embodiment the SVT server 106 manages the SVT client 102 to receive the test case data 110 captured by the SVT client 102 and generates a behavior model (BM) 114 of the SUT 120 based on the test case data 110. In another embodiment, the SVT server 106 may receive the BM 114 of the SUT 120 as generated by the SVT client 102. The SVT server 106 also manages the SVT probe 104 to cause the SVT probe 104 to automatically run test cases and receives the automated test data 118 from the SVT probe 118 for analysis. The SVT server 106 performs scheduling of such automated tests.

The SVT server 106 directly communicates with the SVT document repository 108 to retrieve documents from the SVT document repository 108 and store documents to the SVT document repository 108. For example, the SVT server 106 stores the BM 114 of the SUT 120 in the document repository 108. In one embodiment, the SVT client 102 and the SVT probe 104 communicate with the SVT server 106 via XML (extensible Markup Language) Web Services hosted on the SVT server 106 using Internet Information Services (IIS).

Figure 2:
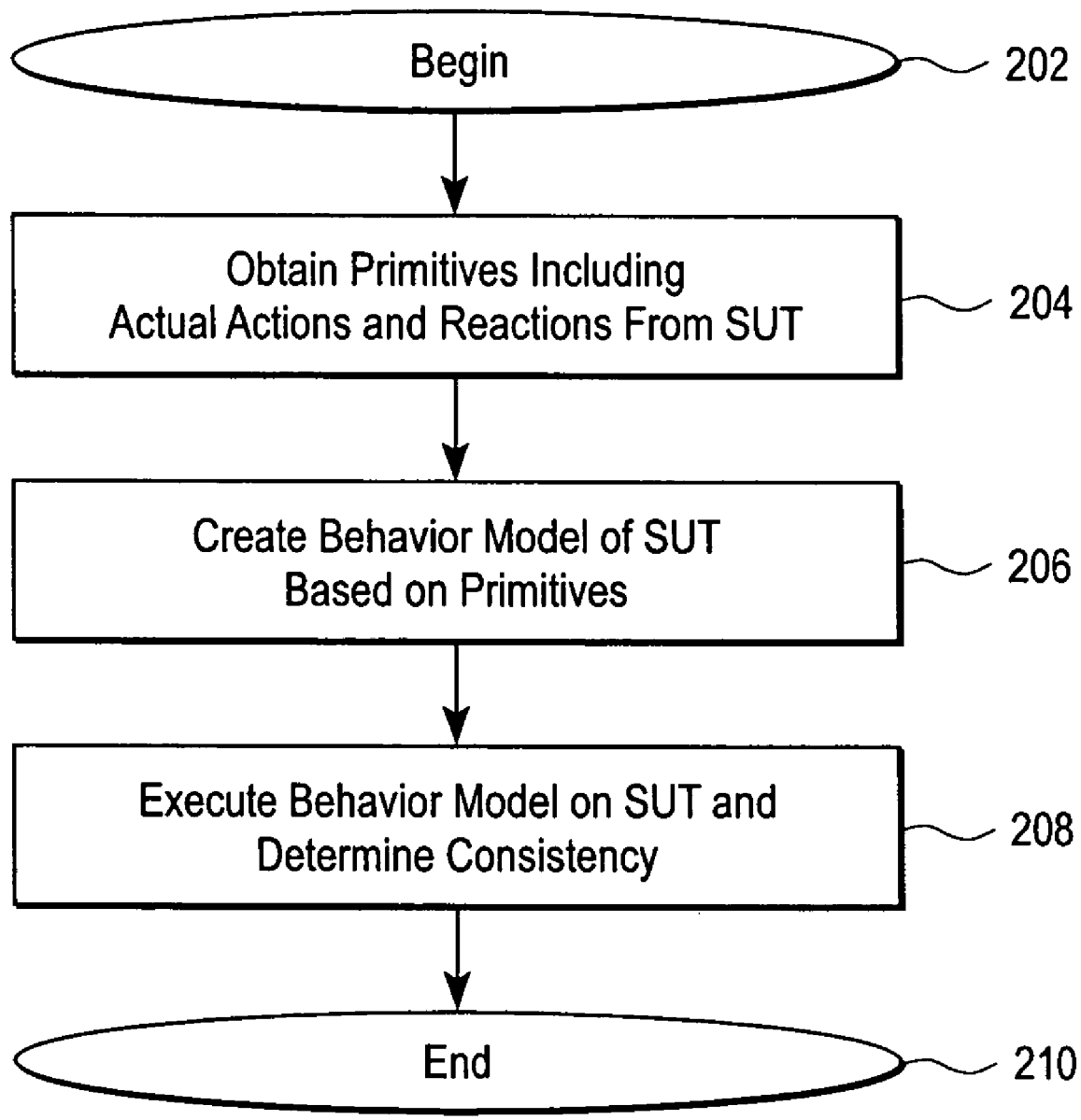
FIG. 2 is a flow chart illustrating a method of performing SVT according to one embodiment of the present invention.

FIG. 2 is a flow chart illustrating a method of performing SVT according to one embodiment of the present invention. For purposes of illustration herein, it will be assumed that the SUT 120 is a networking device, such as a router, responding to commands issued from the SVT client 102 and the SVT probe 104 over a network. The protocol used between the SVT client 102 and the SUT 120 is CLI (command line interface) executed over the telnet protocol. It will be assumed herein that one or more test cases describing the actions to take on the SUT 120 for the SVT has already been designed. For example, a test case Test 1 may be comprised of the following commands to the networking device SUT 120 with a particular execution time t1: (i) login, (ii) view software version, and (iii) exit. Another test case Test 2 may be same as the test case Test 1 except that it is configured to be executed at a timing t2 different from the executing timing t1 of the test case Test 1.

As the process begins 202, the SVT client 102 obtains 204 the primitives from the packets exchanged between the SVT client 102 and the SUT 120 as a result of execution of the test cases from the SVT client 102 to the SUT 120. For example, the SVT client executes the test cases Test 1 and Test 2 on the SUT 120, and captures the primitives in the packets exchanged between the SVT client 102 and the SUT 120. That is, the set of CLI commands (actions) from the SVT client 102 and the corresponding responses from the SUT 120 are interpreted. The CLI command actions and the reactions are in the form of ASCII (American Standard Code for Information Interchange) character strings. The CLI command actions also include the time at which that action is performed, and the reaction includes the response time, i.e., the time it took for the SUT 120 to respond once it received the CLI command. In addition to the command actions, there may also be other actions, such as the opening of the telnet session, the exchange of telnet options, and the closing of the telnet session.

More specifically, the primitives include the actions to the SUT 120, e.g., the commands "log-in," "view software version," and "exit" to the SUT 120 in the test cases T1, T2. The primitives also include the reactions to such actions, such as the responses from the SUT 120 to the commands "log-in," "view software version," and "exit," and may also include the timings of completion of the execution of such commands. In order to obtain a wide range of possible reactions corresponding to the actions, the test cases may be executed multiple times with or without variations (e.g., variations in execution time), with each instance of the execution of the test cases generating primitives to be captured.

By understanding the protocols involved (e.g., telnet, HTTP (Hypertext Transfer Protocol), ICMP (Internet Control Message Protocol), SNMP (Simple Network Management Protocol), etc.) in the packets exchanged between the SVT client 102 and the SUT 120 in the test cases, a sequence of actions from the tester SVT client 102 and the reactions from the SUT 120 may be identified from the packets. In other embodiments, the captured primitives may simply be provided to the SVT client 102 or the SVT server 106 by a third party.

Based on the captured primitives, a behavior model (BM) modeling the SUT 120 is created (generated or built) 206 automatically by the SVT client computer 102 or the SVT server 106. The BM of the SUT 120 describes a sequence of actions to take against the SUT 120, and the reactions that come from that SUT 120. A BM may be retrospective in that it describes what actually happened, or it may be declarative in that it describes what should happen or is expected. And it may be both retrospective and declarative in the sense that it may describe both what was expected to happen in a specific situation and what actually happened. The BM may be described in a computer programming language such as XML. The BM will be explained in greater detail below with reference to FIGS. 3 and 4.

Once the BM is created 206, the BM is executed 208 on the SUT 120 automatically by the SVT probe 104 according to a schedule managed by the SVT server 106, and the sequence of actions to the SUT 120 and the corresponding reactions from the SUT 120 are recorded by the SVT probe 104 to determine 208 whether the actual reactions from the SUT 120 are consistent with the expected reactions corresponding to the actions to the SUT 120. Inconsistent reactions are identified as anomalies of the SUT 120, so that SVT can be performed.

Depending on the protocols used between the testing source and the system-under-test, the "recording" process may be very different. When the SUT 120 is a networking system, this recording is performed by the SVT probe 104 monitoring the computer network for traffic between the SVT probe 104 and the SUT 120. In other embodiments, the SVT probes 104 may be located at certain interface boundaries where APIs (Application Program Interfaces) are invoked, and the APIs that are executed and the results that the APIs produce can be recorded by the SVT probe 104. The SVT probe 104 may also be located at the user interface level, for example, the SVT probe 104 may be at a GUI (Graphic User Interface) application level to monitor Windows messages, mouse gestures, and/or keyboard activities as the actions to the SUT 120 while watching the contents of the screen windows for the reactions corresponding to such actions. Note that the SVT system 100 of the present invention is not limited to any particular type of SUT 120 or any particular type of protocol used to communicate with the SUT 120.

Figure 3:
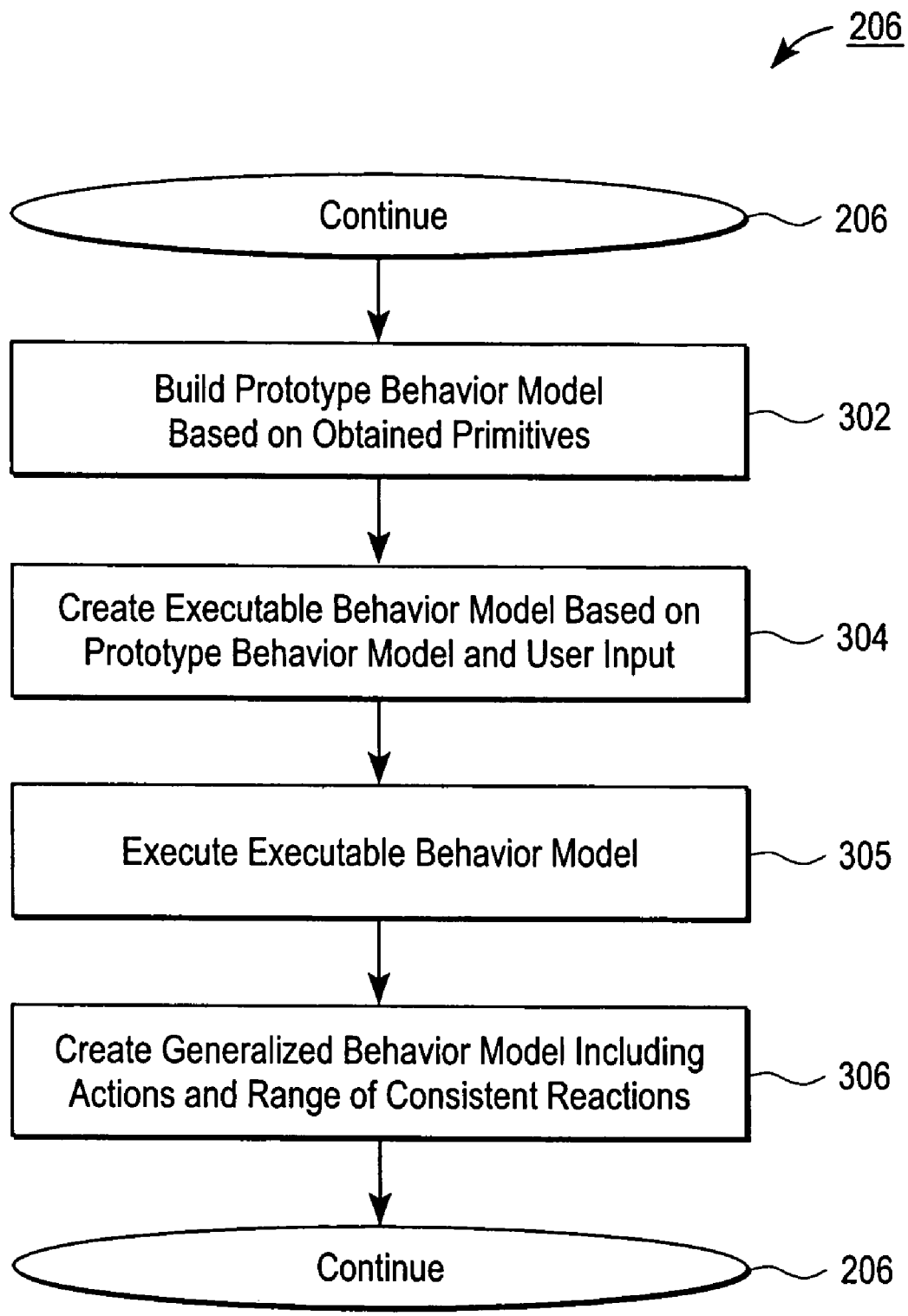
FIG. 3 is a flow chart illustrating the step 206 in FIG. 2 of creating the behavior model (BM) of the System Under Test (SUT) in greater detail, according to one embodiment of the present invention.

FIG. 3 is a flow chart illustrating the step 206 of creating (generating or building) the BM of the SUT 120 in greater detail. As explained above, the SVT client 204 captures the primitives from the test cases, for example, Test 1 and Test 2. Using these primitives, a prototype BM is created 302. The prototype BM is a "retrospective" BM because it records the actions and corresponding reactions in the executed test cases, e.g., Test 1 and Test 2. Then, an executable BM is created (generated or built) 304 based on the prototype BM and user input, if any. The executable BM is a transformation of the prototype BM reflecting user input and typically includes multiple instances of the test case. For example, the user may have the executable BM to be a simple concatenation of the test cases, e.g., Test 1 and Test 2. The executable BM may also be a different combination of the test cases, e.g., one instance of Test 1 and 10 instances of Test 2. The executable BM may be configured by user input or automatically by the SVT client 102 or the SVT server 106 according to a predetermined algorithm.

The executable BM is executed 305 by the SVC client 102, and the actions and corresponding reactions from the SUT 120 are captured, this time to create (generate or build) 306 a generalized behavior model (BM), and the process continues 204. The generalized BM is "declarative" because it describes the actions and expected reactions corresponding to the actions using a parameterized language called "behavior modeling language" as will be explained in greater detail below with reference to FIG. 4. The parameters define a "range" of expected reactions corresponding to the actions to the SUT 120. As a result, the generalized BM reflects the reality that SUT 120 may not be able to produce identical reactions given a similar initial state and an identical sequence of actions.

The simplest declarative behavior model may describe a precisely timed sequence of specific actions and the expected reactions, allowing no flexibility in the timing, actions, or reactions. For very simple SUTs 120, this could be useful, since simple systems will produce identical reactions given the same initial state and sequence of actions. In such cases a declarative BM can be created based on the retrospective BM by simply copying the timed actions and setting the expected reactions to be identical to the reactions that were recorded in the retrospective BM.

In most realistic cases, however, the SUT 120, even without any changes, is unlikely to produce an identical sequence of reactions the next time a set of actions is repeated. It is more likely that large parts of the reactions will be identical every time the actions are executed with small differences, for example, differences in execution times and the like. This is why the executable BM should include multiple instances of test cases so that the reactions corresponding to actions executed in different instances may be captured in creating the generalized BM.

In this regard, the notion of a "reaction space" can be used to explain the generalize BM. A test case can be viewed as a vector of actions that produces a vector of reactions. Each repetition of the same set of actions, or a test case, will produce another vector of reactions. Although this will be a highly non-linear space, it is conceptually possible to plot this vector of reactions as a point in this conceptual reaction space with each point in the reaction space representing a different possible set of reactions. Points that are near to each other in the reaction space represent systems that respond similarly for the purpose of the test case.

Figure 6A:
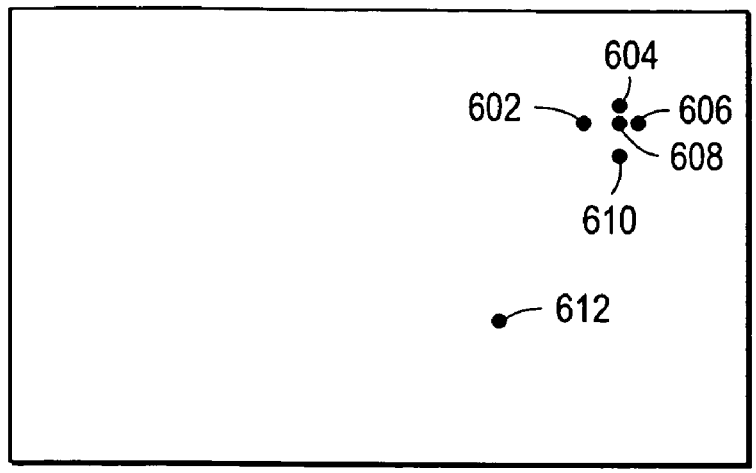
FIGS. 6A-6C illustrate the concept of reaction space, according to one embodiment of the present invention.
Figure 6B:
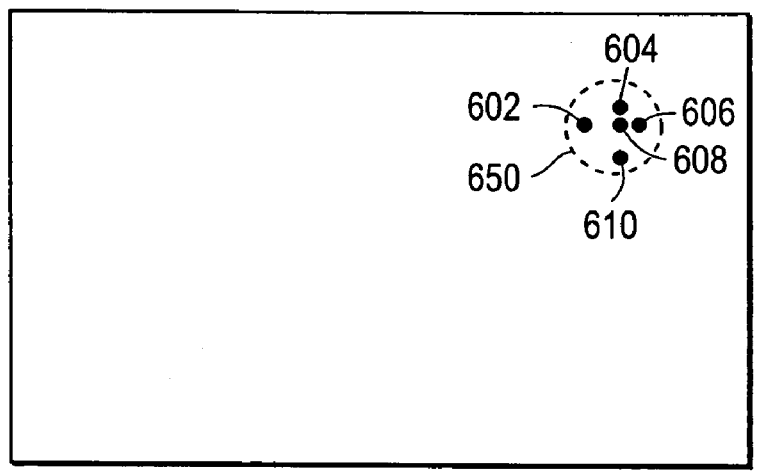
Figure 6C:
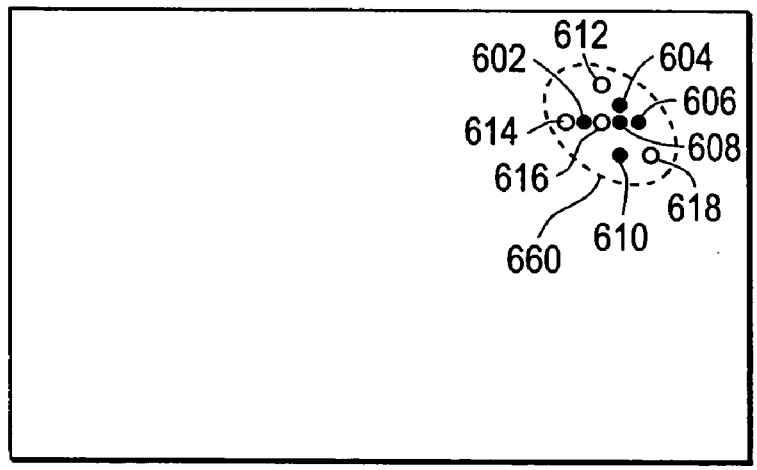

FIGS. 6A-6C illustrate the concept of reaction space according to the present invention. Referring to FIG. 6A, each point 602, 604, 606, 608, 610, 612 represents the sequence of reactions from one "run" of a test case. The points 602, 604, 606, 608, 610 represent the reaction vectors corresponding to runs that appear to be "clustered." The point 612 corresponding to another run of the test case is shown separated from that cluster. Assuming that the reaction space was defined appropriately, i.e., the distance in the reaction space represents the difference in behavior of the SUT 120, and the run represented by the point 612 represents an anomaly in the behavior of the SUT 120.

The range of reactions consistent with the expected reactions from the SUT 120 may be determined by repeating the same sequence of actions many times. This is why the executable BM should include multiple instances of test cases. Each run of the test case produces a new point in the reaction space. Referring to FIG. 6B, by identifying clusters 650 among the points in the reaction space, the expected reactions of the SUT 120 can be generalized to create 306 a generalized BM. The dotted lines of the cluster 650 represent a region of acceptable or expected behavior/reactions of the SUT 120. If a new system is tested with the same set of reactions and it results in a point outside of the region 650, then the new system, for the purposes of the test case, can be considered not equivalent to the original SUT 120 against which the test cases were run.

Another factor that needs to be considered in creating the generalized BM is "perturbation." For some SUTs, small perturbations in the actions will result in only small variations in the reactions. However, for some systems, some perturbations in the action timing or initial state can result in measurable differences in the reactions from the tested system. For example, typing "ping www.fnfr.com" into a telnet window, waiting 2 seconds and then entering Ctrl-C on a computer will result in three lines of responses. But if Ctrl-C is entered just a fraction of a second earlier, one of those response lines may be missing. Since it is not possible to exactly reproduce the same set of actions (because of timing variability) nor an absolutely identical initial state in most cases, there will always be some perturbation between different runs of a test case.

As shown in FIG. 6C, as the actions are perturbed in timing, the resulting reactions may spread out to generate additional reaction vectors 612, 614, 616, and 618. For most systems, the additional reaction vector points will not spread very far in the reaction space, but the size of the expected reaction region 660 will grow larger compared with the region 650 in FIG. 6B without perturbation. Since it is preferable to remove some of such sensitivity of the SUT 120 to time variations in the created BM, in one embodiment, the executable BM is created 304 with additional actions having perturbed timings in the test cases so that that the space of actions immediately surrounding the timed actions that were originally captured can be explored in creating the generalized BM. Therefore, referring back to FIG. 3, when the executable BM is created 305, in one embodiment it can include actions (CLI commands) with the execution timings slightly perturbed by a random amount compared to the timing of actions of the original captured primitives.

Figure 4:
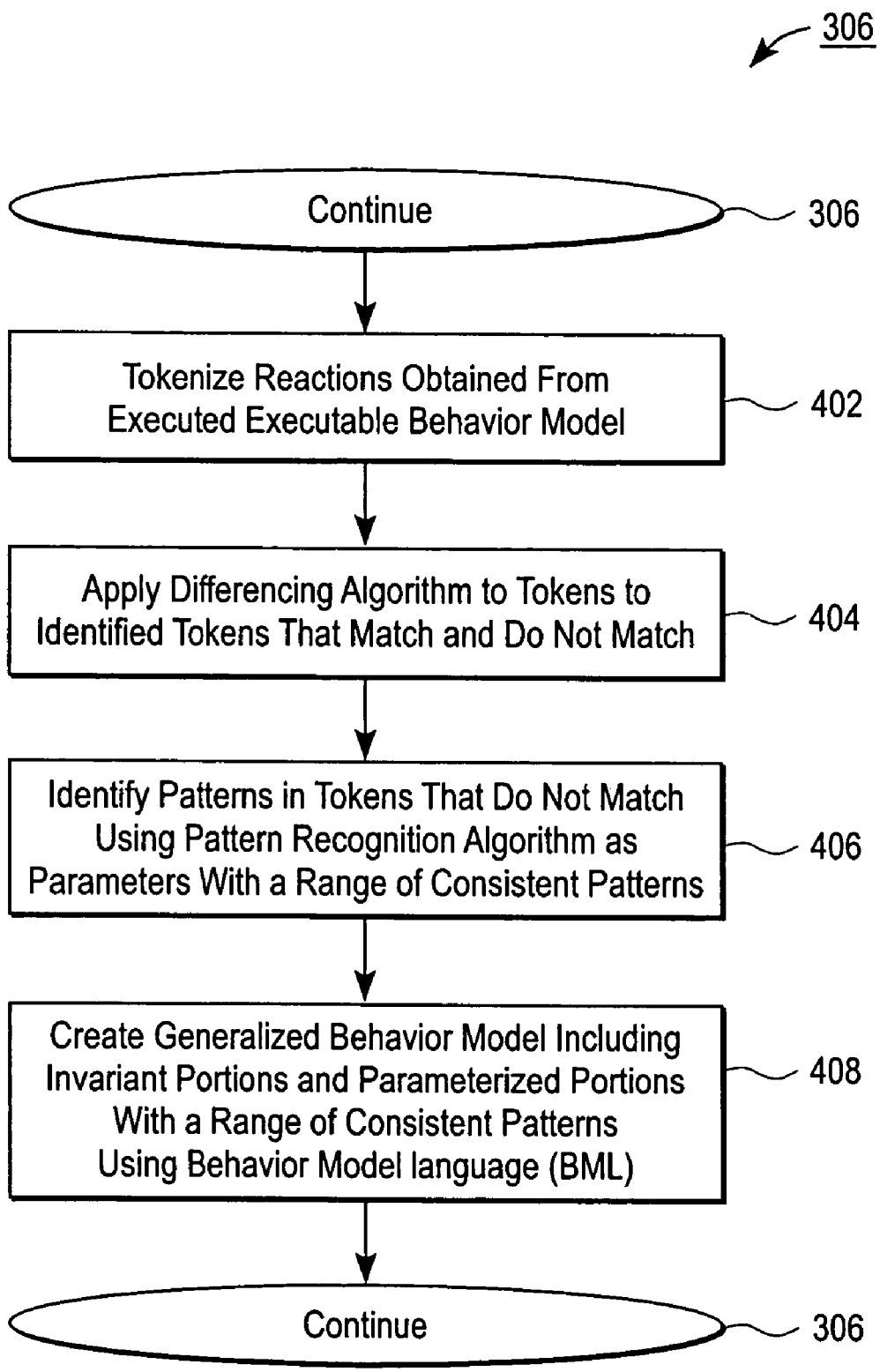
FIG. 4 is a flow chart illustrating the step 306 in FIG. 3 of creating the generalized BM in greater detail, according to one embodiment of the present invention.

FIG. 4 is a flowchart illustrating the step 306 in FIG. 3 of creating the generalized BM in greater detail. In creating 306 the generalized BM, the SVT client 102 captures the reactions to the actions from the executed 305 executable BM. If they are all identical, then one can expect that exactly the same response to the corresponding action will be obtained at such point in the test case against the SUT 120. If, however, the responses are not all identical as in most cases, the individual reactions are tokenized 402, turning them into arrays of word/number/character tokens.

A differencing algorithm is applied 404 to identify the tokens that match up and those that do not. Any state of the art differencing algorithm may be used, such as one described in Hirschberg, D. S., "Algorithms for the Longest Common Subsequence Problem," Journal of the ACM, 24(4) (1977), pp. 664-675.

In addition, a pattern recognition algorithm is applied 406 to the tokens that do not match up to identify 406 certain patterns or similarities that can be described generally. Any state of the art pattern recognition algorithm may be used to identify certain patterns, for example, (i) tokens that take one of only a few different values, (ii) numeric tokens whose values always fall into a certain range, and (iii) numeric tokens whose values increment run-to-run of the test case by values in a certain range, (iv) numeric tokens whose values are related to other prior tokens in the same run, i.e., is within a certain range of that prior numeric token's value, and (v) numeric tokens whose values increment in a direct proportion to time, such as timestamps that are constantly growing in a predictable manner against the clock of the SUT. The generalized BM can be created (generated or built) 408 as including invariant portions of the reactions and the parameterized portions with a range of consistent patterns. The "range" of consistent patterns may be defined by, for example, reactions whose values fall within a predetermined multiple of standard deviations.

In one embodiment of the present invention, the BM is described in what is called a Behavior Model Language (BML). BML describes actions to and reactions from the SUT 120 in a protocol-neutral way, using XML. A BM is comprised of a list of "primitives" and a list of "reference actions."

Each primitive contains the description of an action and its corresponding reaction, together with information ancillary to the actions and reactions, such as timing and the like. Each action and reaction is comprised of a set of templates each of which is a XML fragment. Each XML fragment can contain any protocol-specific tags that are needed to describe how to repeat that action or describe that reaction. But these templates can also contain tags that are treated specially for behavior models. For example, a <Behavior:Token> tag identifies a replaceable field within the action or reaction. The contents of the Token tag clarify what should replace it in its final form. For another example, a <Behavior:Repeat> tag may identify an XML fragment that should be repeated for a specified number of times.

The following is a simplified example of a fragment of a BM:

```
<Primitive id='P1.2'>
    <ExpectedAction>
        <CliCommand> <p> show date </p> </CliCommand>
    </ExpectedAction>
    <ActualAction>
        <CliCommand> <p> show date </p> </CliCommand>
    </ActualAction>
    <ExpectedReaction>
        <CliReaction>
            <p> The current date is
                <Behavior:Token id='T1'>
                    <Format> YYYY/MM/DD HH:MM:SS
                    </Format>
                    <Patterns>
                        <TimeDependence> Seconds
                        </TimeDependence>
                    </Patterns>
                </Behavior:Token> </p>
            <p>This has been called
                <Behavior:Token id='T2'>
                    <Format> Integer </Format>
                    <Patterns>
                        <Range>
                            <Min> 2 </Min>
                            <Max> 5 </Max>
                        </Range>
                    </Patterns>
                </Behavior:Token> times.</p>
        </CliReaction>
    </ExpectedReaction>
    <ActualReaction>
        <CliReaction>
            <p>The current date is 2004/06/22 24:15:05</p>
            <p>This has been called 9 times.</p>
```

-continued

```
        </CliReaction>
    </ActualReaction>
    <Anomalies>
        <Anomaly id='A1'>
            <Type> ResponseTokenPatternMismatch </Type>
            <Template> DEFAULT </Template>
            <Token> T2 </Token>
            <Message> Expected value [2 . . . 5], but received 9
            </Message>
        </Anomaly>
    </Anomalies>
</Primitive>
```

The above fragment of a BM shows a primitive that includes both expected and actual reactions. Such BM can be created when the BM is executed, for example, in step 208 of FIG. 2. The expected action and reaction portions from <ExpectedAction> to </ExpectedAction> and from <ExpectedReaction> to </ExpectedReaction> are the declarative BM parts that explain what is expected from the SUT 120. Such declarative BM is created when, for example, the generalized BM is created in steps 306 and 408 of FIGS. 3 and 4, respectively. The actual action and reaction portions from <ActualAction> to </ActualAction> and from <ActualReaction> to </ActualReaction> are the retrospective BM parts that describe the results from running the test case on the SUT 120. The anomalies part from <Anomalies> to </Anomalies> describe the inconsistencies between the expected reactions and the actual reactions.

The <Behavior:Token> tags describe the expected format of the field, together with any patterns to describe an acceptable range of values for the contents of that field. The paragraph tags (<p> . . . </p>) are mere tags used in this implementation of the CLI protocol to describe line boundaries and are examples of an XML tag that is protocol-specific. Another example of a protocol-specific tag would be in support of HTTP (Hypertext Transfer Protocol) where the contents of an HTTP response will commonly be HTML (Hypertext Markup Language), which can be converted into XML using a variety of SGML (Standard Generalized Markup Language) tags.

Reference reactions recognize that it is common to see a group of reactions that are very similar. This similarity can be captured in a reference reaction fragment, and only differences from the reference reactions need be stored in the individual reactions that reference it. Each reference reaction looks almost identical to the reaction portion of an individual primitive as described above. In the case where a primitive becomes associated with a reference reaction, the primitive includes a new XML tag called <ReferenceReaction> whose contents identify the associated reference reaction, using its ID attribute. The body of that primitive's reaction then only needs to contain a list of the tokens that are overridden or otherwise are specific to that primitive's instantiation of the associated reference reaction.

Reference reactions are useful in situations where a system's behavior varies in a way such that its impact will manifest itself similarly in many different reactions. In such cases, it becomes convenient to describe the behavioral change as it affects the group at once, rather than as many separate anomalies. Another benefit of reference reactions is that if the expected behavior that is in common to several primitives needs to be changed, this can often be done in a single place (i.e., in the reference reaction) rather than repeatedly in each of the associated primitives. Also, for large test cases, the number of similar reactions can be substantial. By using reference reactions, the entire behavior model becomes more compact, take less memory space of the computer running the SVT system 100, and operate more efficiently.

Figure 5:
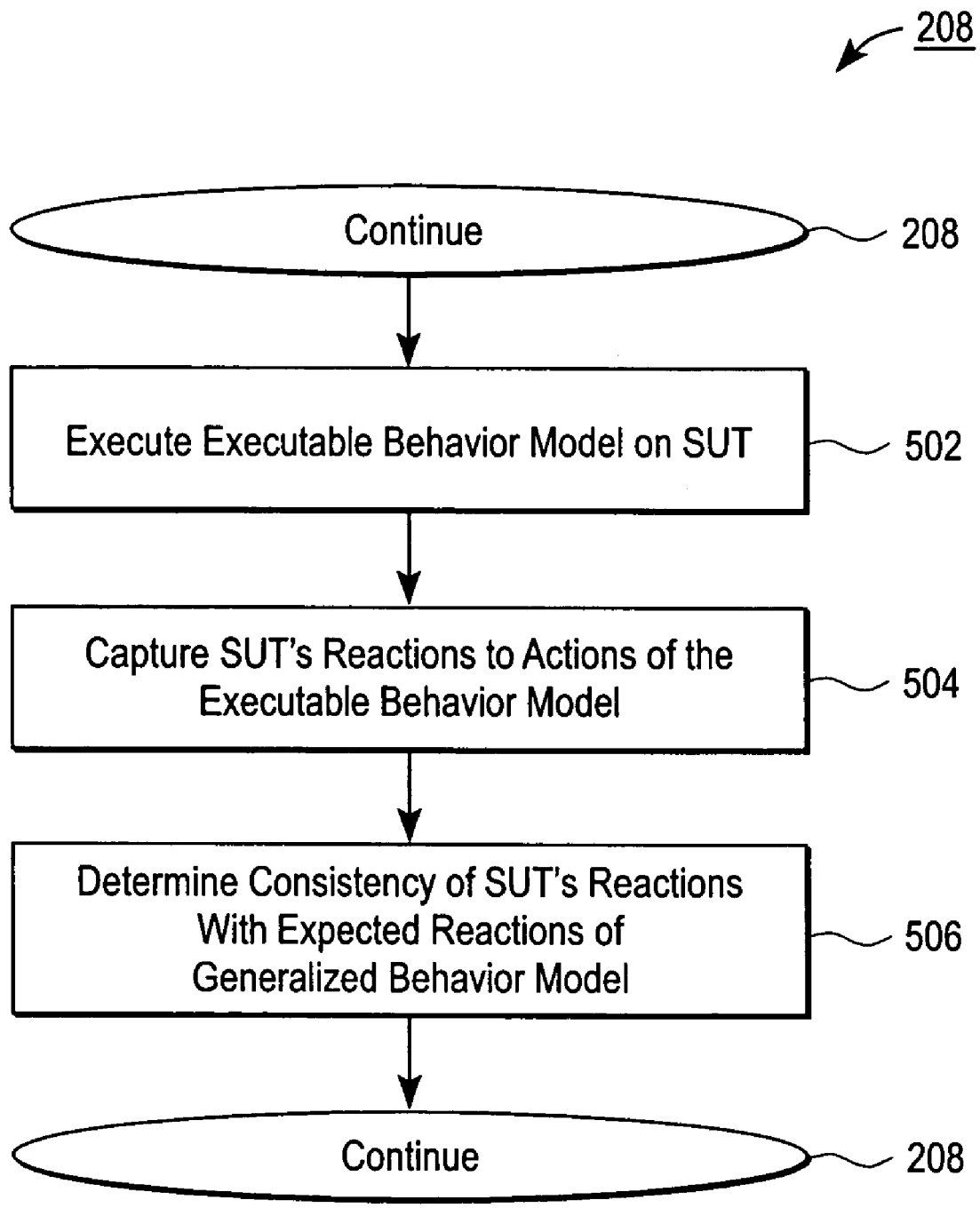
FIG. 5 is a flow chart illustrating the step 208 in FIG. 2 of executing the BM on the SUT to determine consistency, according to one embodiment of the present invention.

FIG. 5 is a flow chart illustrating the step 208 in FIG. 2 of executing the BM on the SUT to determine consistency in greater detail, according to one embodiment of the present invention. As the process continues 208, the SVT probe 104 executes 502 the executable BM on the SUT 120, and captures 504 the reactions corresponding to the actions in the executable BM from the SUT 120. The captured reactions are compared with the range of expected reactions in the generalized BM to determine 506 consistency with the generalized BM. Inconsistent reactions are identified as anomalies, which would then be further examined by human operators of the SVT 100, and the process continues 208.

FIGS. 7A and 7B illustrate a sample user interface provided by the SVT client 102 when the primitives are captured in step 204 of FIG. 2. Referring to FIG. 7A, the captured actions include, for example, "login" 702, "view software version" 704, and "exit" 706 to a router emulator test bed 708. Referring to FIG. 7B, the captured reactions 710 to the action 712 of "view software version" 704 are shown. In one embodiment, the response time 714 is also captured.

FIGS. 8A and 8B illustrate a sample user interface provided by the SVT client 102 when the generalized BM of the SUT is created in step 206 of FIG. 2. Referring to FIG. 8A, the test case is comprised of, for example, "login" 802, "view software version" 804, and "exit" 806 to a router emulator test bed 808. Referring to FIG. 8B, the expected reactions 810 to the action 812 of "show software version" 804 include a parameterized router up-time 816 with the parameter T1. The patterns 818 show the range of expected, acceptable values for the parameter T1. The response time 814 for the action 812 is also shown.

FIGS. 9A, 9B, and 9C illustrate a sample user interface provided by the SVT probe 104 when the BM of the SUT is executed in step 208 of FIG. 2. Referring to FIG. 8A, the test case is comprised of, for example, "login" 902, "view software version" 904, and "exit" 906 to a router emulator test bed 908. The actual timing 910 of the execution of the test case is also shown. Referring to FIG. 9B, the expected reactions 810 to the action of "show software version" 804 are compared with the actual reactions 914 to the test case action of "show software version" 904 to determine whether the actual reactions 914 are consistent with the range of expected reactions 810. The actual response time 916 for the action 904 is also compared with the expected response time 814 for the test case action 804. Anomalies in the actual response 914 are identified in the patterns section 916 to alert the human operator running the SVT system 100.

The SVT system 100 of the present invention has the advantage that most of the mundane manual work in SVT has been eliminated. Virtually all test cases are automated, so no manual regression testing is needed. There is no need to write or debug any scripts for the SVT. Since behavior models are automatically created by a computer based on the captured primitives, there is no need to deal with the mundane aspects of parsing and validating reactions.

The SVT system 100 of the present invention also has the advantage that it does not isolate one specific field (or fields) among the multitude of reactions in a test case to decide whether the test case should pass or fail. It looks at a plurality of fields in a plurality of reactions and checks to see if those fields are consistent or inconsistent with the corresponding field when the BM of the SUT 120 was built. This is more likely to identify any defect in the SUT 120 than in conventional manual or conventional automated SVT.

Although the present invention has been described above with respect to several embodiments, various modifications can be made within the scope of the present invention. The present invention is not limited to any specific type of System Under Test; the SUT 120 can be any type of hardware or software system so long as it can be monitored by a computer system running the SVT and test cases from the SVT system can be re-executed on the SUT. The method of describing the BM is not limited to using BML as described herein; any other computer programming language can be used so long as it can describe the actions and corresponding reactions from the SUT. Accordingly, the disclosure of the present invention herein is intended to be illustrative, but not limiting, of the scope of the invention, which is set forth in the following claims.

What is claimed is:

1. A computer-implemented method for system verification testing of a system under test, the method comprising the steps of:

obtaining a set of actions and individual reactions corresponding to the actions from a plurality of runs of a test case for the system under test; and generating a generalized behavior model representing the system under test in terms of the set of actions and ranges of expected reactions, each range corresponding to one of the actions and generalizing the individual reactions to said one of the actions, wherein the step of generating the generalized behavior model comprises the steps of:

generating a prototype behavior model for the system under test based upon the actions and individual reactions corresponding to the actions from a single run of the test case;

generating an executable behavior model based on the prototype behavior model, the executable behavior model including the actions in at least a plurality of runs of the test case;

executing the executable behavior model on the system under test to obtain the individual reactions corresponding to the actions in the plurality of runs of the test case; and generating the generalized behavior model including the actions in the test case and the ranges of expected reactions corresponding to the actions, each of the ranges of expected reactions generalizing the individual reactions corresponding to said one of the actions from the plurality of runs of the test cases.

2. The computer-implemented method of claim 1, wherein the step of obtaining a set of actions and individual reactions comprises capturing primitives including the actions and the individual reactions from packets exchanged between a system verification system and the system under test.

3. The computer-implemented method of claim 1, wherein the step of generating the generalized behavior model comprises the steps of:

generating tokens corresponding to the individual reactions received from the system under test by executing the executable behavior model;

identifying the tokens that match and do not match responsive to said one of the actions;

identifying patterns in the tokens that do not match responsive to said one of the actions; and generating the generalized behavior model including invariant portions corresponding to tokens that match and parameterized portions corresponding to the patterns in the tokens.

4. The computer-implemented method of claim 3, wherein the tokens that match and do not match are identified using a differencing algorithm.

5. The computer-implemented method of claim 3, wherein the patterns in the tokens are identified using a pattern recognition algorithm.

6. The computer-implemented method of claim 1, wherein the step of generating an executable behavior model comprises adding additional actions with perturbed timings to the actions in the test case.

7. The computer-implemented method of claim 1, further comprising the steps of:
executing the generalized behavior model on the system under test;
capturing the resulting individual reactions corresponding to the actions in the executed generalized behavior model; and
responsive to determining that the resulting individual reactions are inconsistent with the range of expected reactions, identifying the inconsistent individual reactions as an anomaly in the system under test.

8. The computer-implemented method of claim 7, further comprising determining a response time for executing the generalized behavior model on the system under test.

9. The computer-implemented method of claim 1, wherein the generalized behavior model is described in XML (eXtensible Markup Language).

10. The computer-implemented method of claim 1, wherein the system under test is a networking device and the actions include commands to the networking device.

11. A verification system for testing a system under test, the verification system comprising:
a client computer for capturing a set of actions and individual reactions corresponding to the actions from a plurality of runs of a test case for the system under test; and
a server computer coupled to the client computer for generating a generalized behavior model representing the system under test in terms of the set of actions and ranges of expected reactions, each range corresponding to one of the actions and generalizing the individual reactions to said one of the actions, wherein the server computer generates the generalized behavior model by:
generating a prototype behavior model for the system under test based upon the actions and individual reactions corresponding to the actions from a single run of the test case;
generating an executable behavior model based on the prototype behavior model, the executable behavior model including the actions in at least a plurality of runs of the test case;
executing the executable behavior model on the system under test to obtain the individual reactions corresponding to the actions in the plurality of runs of the test case; and
generating the generalized behavior model including the actions in the test case and the ranges of expected reactions corresponding to the actions, each of the ranges of expected reactions generalizing the individual reactions corresponding to said one of the actions from the plurality of runs of the test cases.

12. The verification system of claim 11, wherein the server computer generates the generalized behavior model by:
generating tokens corresponding to the individual reactions received from the system under test by executing the executable behavior model;
identifying the tokens that match and do not match responsive to said one of the actions;
identifying patterns in the tokens that do not match responsive to said one of the actions; and
generating the generalized behavior model including invariant portions corresponding to tokens that match and parameterized portions corresponding to the patterns in the tokens.

13. The verification system of claim 11, further comprising:
a probe computer coupled to the server computer for executing the generalized behavior model on the system under test and capturing the resulting individual reactions corresponding to the actions in the executed generalized behavior model, wherein the server computer, responsive to determining that the resulting individual reactions are inconsistent with the range of expected reactions, identifies the inconsistent individual reactions as an anomaly in the system under test.

14. The verification system of claim 11, wherein the system under test is a networking device and the actions include commands to the networking device.

15. A computer readable medium storing a computer program product configured to cause a computer to perform a computer-implemented method for system verification testing of a system under test, the computer-implemented method comprising the steps of:
obtaining a set of actions and individual reactions corresponding to the actions from a plurality of runs of a test case for the system under test; and
generating a generalized behavior model representing the system under test in terms of the set of actions and ranges of expected reactions, each range corresponding to one of the actions and generalizing the individual reactions to said one of the actions, wherein the step of generating the generalized behavior model comprises the steps of:
generating a prototype behavior model for the system under test based upon the actions and individual reactions corresponding to the actions from a single run of the test case;
generating an executable behavior model based on the prototype behavior model, the executable behavior model including the actions in at least a plurality of runs of the test case; executing the executable behavior model on the system under test to obtain the individual reactions corresponding to the actions in the plurality of runs of the test case; and
generating the generalized behavior model including the actions in the test case and the ranges of expected reactions corresponding to the actions, each of the ranges of expected reactions generalizing the individual reactions corresponding to said one of the actions from the plurality of runs of the test cases.

16. The computer readable medium of claim 15, wherein the step of obtaining a set of actions and individual reactions comprises capturing primitives including the actions and the individual reactions from packets exchanged between a system verification system and the system under test.

17. The computer readable medium of claim 15, wherein the step of generating the generalized behavior model comprises the steps of:
generating tokens corresponding to the individual reactions received from the system under test by executing the executable behavior model;
identifying the tokens that match and do not match responsive to said one of the actions;

identifying patterns in the tokens that do not match responsive to said one of the actions; and generating the generalized behavior model including invariant portions corresponding to tokens that match and parameterized portions corresponding to the patterns in the tokens.

18. The computer readable medium of claim 17, wherein the tokens that match and do not match are identified using a differencing algorithm.

19. The computer readable medium of claim 17, wherein the patterns in the tokens are identified using a pattern recognition algorithm.

20. The computer readable medium of claim 15, wherein the step of generating an executable behavior model comprises adding additional actions with perturbed timings to the actions in the test case.

21. The computer readable medium of claim 15, wherein the method further comprises the steps of:

executing the generalized behavior model on the system under test;

capturing the resulting individual reactions corresponding to the actions in the executed generalized behavior model; and responsive to determining that the resulting individual reactions are inconsistent with the range of expected reactions, identifying the inconsistent individual reactions as an anomaly in the system under test.

22. The computer readable medium of claim 21, wherein the method further comprises the step of determining a response time for executing the generalized behavior model on the system under test.

23. The computer readable medium of claim 15, wherein the generalized behavior model is described in XML (eXtensible Markup Language).

24. The computer readable medium of claim 15, wherein the system under test is a networking device and the actions include commands to the networking device.

* * * * *